United States Patent
Landacre et al.

(10) Patent No.: US 11,028,837 B2
(45) Date of Patent: Jun. 8, 2021

(54) SOLENOID PUMP

(71) Applicant: MAC Valves, Inc., Wixom, MI (US)

(72) Inventors: Brett Landacre, Bloomfield Hills, MI (US); Matthew Neff, Birmingham, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 218 days.

(21) Appl. No.: 16/260,741

(22) Filed: Jan. 29, 2019

(65) Prior Publication Data
US 2020/0240540 A1    Jul. 30, 2020

(51) Int. Cl.
| F16K 31/06 | (2006.01) |
| F04B 17/04 | (2006.01) |
| F04B 45/047 | (2006.01) |
| F04B 43/04 | (2006.01) |
| F04B 53/10 | (2006.01) |

(52) U.S. Cl.
CPC ............ *F04B 17/044* (2013.01); *F04B 17/04* (2013.01); *F04B 43/04* (2013.01); *F04B 45/047* (2013.01); *F04B 53/106* (2013.01); *F16K 31/0675* (2013.01); *F16K 31/0693* (2013.01)

(58) Field of Classification Search
CPC ...... F04B 43/04; F04B 17/042; F04B 17/044; F04B 35/045; F04B 43/0054; F04B 45/047; F16K 31/0693; F16K 31/0696; F16K 31/0606
See application file for complete search history.

(56) References Cited

U.S. PATENT DOCUMENTS 5,284,425 A * 2/1994 Holtermann ............ F04B 43/04
                                                  417/395
5,967,487 A * 10/1999 Cook ................. F02M 25/0836
                                                  251/129.07
(Continued)

FOREIGN PATENT DOCUMENTS

| CN | 106762567 A | 5/2017 |
| DE | 102007059237 B3 | 2/2009 |
| GB | 1039145 A | 8/1966 |

OTHER PUBLICATIONS

European Search Report from Application No. 20153884.0 dated Apr. 16, 2020.

*Primary Examiner* — Dominick L Plakkoottam
(74) *Attorney, Agent, or Firm* — Harness, Dickey & Pierce, P.L.C.

(57) ABSTRACT

A solenoid pump that includes a base and a solenoid having a coil and a pole piece. A retainer body, positioned inside the solenoid and the base, includes an armature cavity that receives an armature in a sliding fit for movement between energized and de-energized positions. A diaphragm, mounted in the armature cavity, is connected to the armature. An inlet check valve permits fluid flow in only a first direction moving from an inlet port toward the diaphragm. An outlet check valve permits fluid flow in only a second direction moving from the diaphragm toward an outlet port. A fluid flow path extends through the retainer body from the inlet check valve to the diaphragm and from the diaphragm to the outlet check valve for transporting fluid from the inlet check valve to the outlet check valve as the diaphragm oscillates between first and second positions.

18 Claims, 4 Drawing Sheets

(56) References Cited

U.S. PATENT DOCUMENTS

| | | | | |
|---|---|---|---|---|
| 6,000,677 A | * | 12/1999 | Cook | F16K 31/0696 251/129.07 |
| 6,758,657 B1 | * | 7/2004 | McNaull | F04B 17/042 417/413.1 |
| 9,341,172 B2 | * | 5/2016 | Kohli | F04B 43/04 |
| 2009/0169402 A1 | * | 7/2009 | Stenberg | F04B 43/04 417/413.1 |
| 2012/0107155 A1 | * | 5/2012 | Fukano | F04B 35/045 417/413.1 |

* cited by examiner

SOLENOID PUMP

FIELD

The present disclosure relates to solenoid operated valves and more particularly to a solenoid operated valves containing a diaphragm that operates as a fluid pump.

BACKGROUND

This section provides background information related to the present disclosure which is not necessarily prior art.

Solenoid operated valves, such as poppet valves, can be used to control the flow of a fluid, such as pressurized air, through a manifold. Such manifolds may be part of equipment such as sorters, packaging machines, food processors, and the like that are driven by the pressurized fluid. Such solenoid operated valves may be operated for millions of cycles. In order to retain the solenoid operated valve in a closed position when the solenoid is de-energized, biasing members such as springs are used. It is also known, for example in U.S. Pat. No. 4,598,736 to Chorkey, that fluid pressure can be balanced within the valve to reduce a solenoid force required to move a valve member between closed and open positions.

The valve member is slidingly arranged within a base. In the closed position, a valve member is generally held in contact with a valve seat of the base by the biasing member. In the open position, the solenoid generally moves the valve member away from the valve seat forming a clearance gap therebetween. As disclosed in U.S. Pat. No. 3,985,333 to Paulsen, a bellows shaped diaphragm can be used to provide a seal between the base and the solenoid. Such diaphragms prevent contaminants from working their way towards the solenoid while permitting longitudinal movement of the valve member.

The base is designed to be received in a bore provided in the manifold. The manifold usually includes multiple passageways that are arranged in fluid communication with the manifold bore. In operation, the solenoid operated valve controls fluid flow between these multiple passageways. O-ring seals are typically provided on the outside of the base to seal the base within the manifold bore. Such valves are therefore designed to control the flow of a pressurized fluid and are not configured to act as a pump (i.e., typical solenoid operated valves do not produce any pump head during operation).

SUMMARY

This section provides a general summary of the disclosure, and is not a comprehensive disclosure of its full scope or all of its features.

The subject disclosure provides for a solenoid pump that includes a solenoid and a base. The solenoid includes a coil and a pole piece that are positioned in a solenoid body. The base includes an inlet port and an outlet port. The base is connected to the solenoid body such that the base and the solenoid body cooperate to define an internal chamber within the solenoid pump. A retainer body is positioned inside the internal chamber. The retainer body includes an armature cavity. An armature is disposed in the coil of the solenoid and the armature cavity in a sliding fit. Accordingly, the armature can slide relative to the coil and the retainer body along a longitudinal axis between an energized position and a de-energized position. A biasing member, that acts to normally bias the armature toward the de-energized position, is positioned in the armature cavity. A diaphragm, mounted in the armature cavity, is connected to the armature such that the diaphragm deflects from a first position to a second position in response to movement of the armature along the longitudinal axis from the de-energized position to the energized position.

The solenoid pump includes an inlet check valve and an outlet check valve, both of which are positioned in the internal chamber. The inlet check valve is arranged in fluid communication with the inlet port and permits fluid flow in only a first direction moving from the inlet port toward the diaphragm. The outlet check valve is arranged in fluid communication with the outlet port and permits fluid flow in only a second direction moving from the diaphragm toward the outlet port. A fluid flow path is defined within the solenoid pump that extending through the retainer body from the inlet check valve to the diaphragm and from the diaphragm to the outlet check valve. The fluid flow path transports fluid from the inlet check valve to the outlet check valve as the diaphragm oscillates between the first and second positions. This oscillation of the diaphragm, in combination with the inlet and outlet check valves, pumps fluid from the inlet port of the solenoid pump to the outlet port of the solenoid pump.

In accordance with other aspects of the present disclosure, the fluid flow path is further defined by retainer inlet and outlet passages and a pumping volume in the internal chamber adjacent to the diaphragm. The retainer inlet passage extends through the retainer body from the inlet check valve to the diaphragm. The retainer outlet passage extends through the retainer body from the diaphragm to the outlet check valve. The pumping volume is positioned between the retainer body and the diaphragm when the diaphragm deflects to the second position in response to the armature moving to the energized position. The pumping volume is arranged in fluid communication with the retainer inlet and outlet passages when the diaphragm is in the second position. The pumping volume increases in size when the diaphragm moves from the first position to the second position, which draws fluid in through the inlet check valve. The pumping volume decreases in size when the diaphragm moves from the second position to the first position, which pushes fluid out through the outlet check valve. The solenoid pump may further include an inlet check valve cavity and an outlet check valve cavity, both of which are positioned in the internal chamber. The inlet check valve cavity is arranged in fluid communication with the inlet port and the retainer inlet passage and the inlet check valve is received within the inlet check valve cavity. The outlet check valve cavity is arranged in fluid communication with the outlet port and the retainer outlet passage and the outlet check valve is received within the outlet check valve cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure, where:

Corresponding reference numerals indicate corresponding parts throughout the several views of the drawings.

DETAILED DESCRIPTION

Figure 1:
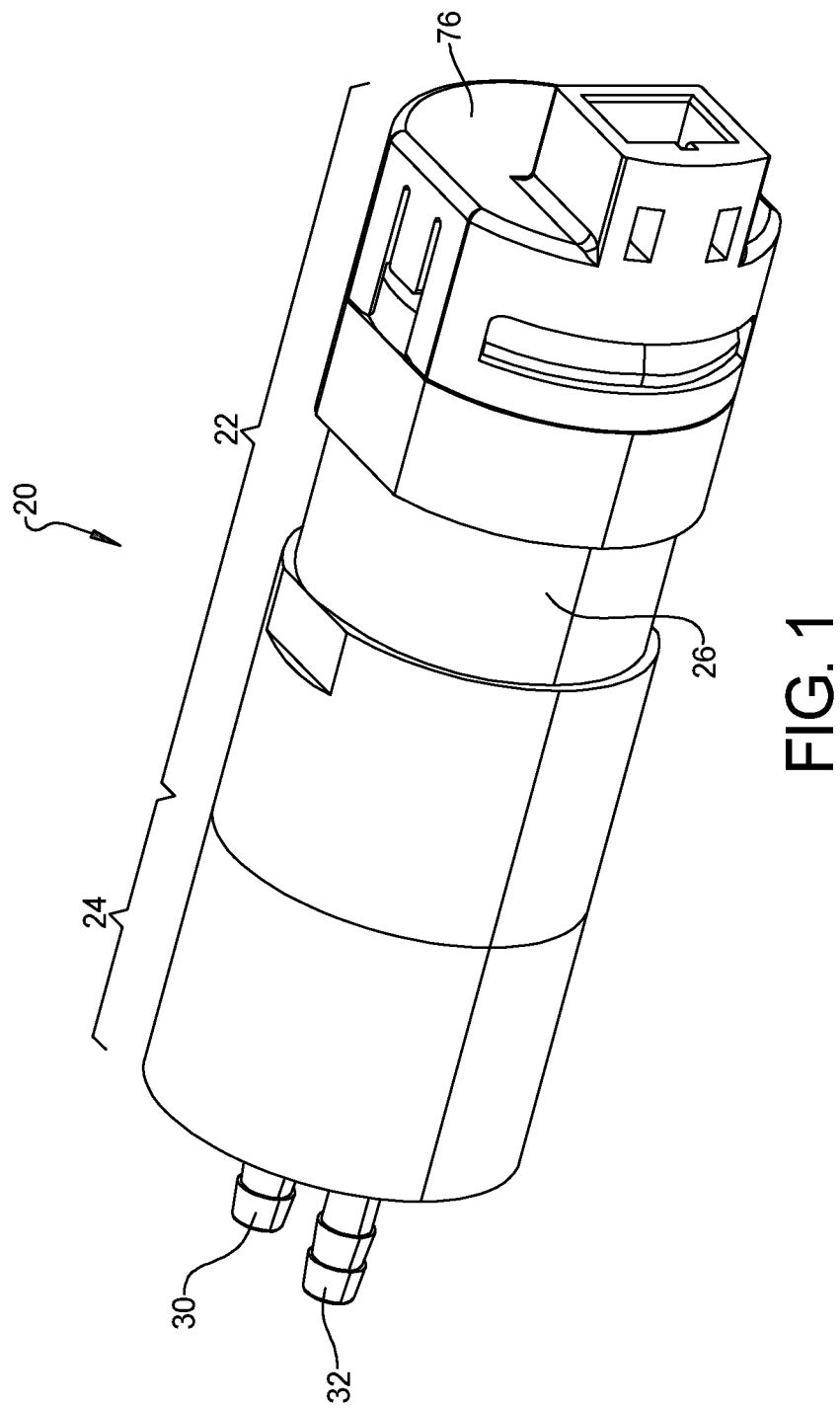
FIG. 1 is a side perspective view of an exemplary an exemplary solenoid pump constructed in accordance with the present disclosure.

Example embodiments will now be described more fully with reference to the accompanying drawings. These example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1-4, an exemplary solenoid pump 20 is illustrated. The solenoid pump 20 includes a solenoid 22 and a base 24. The solenoid 22 includes a solenoid body 26 that is connected to the base 24 such that the base 24 and the solenoid body 26 cooperate to define an internal chamber 27. The solenoid body 26 extends coaxially along a longitudinal axis 28. It should be appreciated that the terms "longitudinal," "longitudinally," "axial," and "axially," when used herein, mean along or parallel to the longitudinal axis 28. The base 24 includes an inlet port 30 and an outlet port 32 and the base 24 is connected to the solenoid body 26 by threaded connection 38. Although other arrangements are possible, the inlet and outlet ports 30, 32 in the illustrated example are provided in the form of longitudinally extending tubular projections that have barded ends.

The solenoid 22 includes a coil 54 and a pole piece 56 that are positioned inside the solenoid body 26. A bobbin 58, also disposed in the solenoid body 26, supports the coil 54. An armature 62 is slidably disposed in the solenoid body 26 for movement along the longitudinal axis 28 between a de-energized position (FIG. 2) and an energized position (FIG. 3). At least part of the pole piece 56 and at least part of the armature 62 are slidably received in the bobbin 58. The pole piece 56 may include a pressure equalizing passage 64 that extends through the pole piece 56 along the longitudinal axis 28. The pole piece 56 may also include a threaded end 66 that engages internal threads 68 in the solenoid body 26. Accordingly, the axial position of the pole piece 56 is adjustable by rotating pole piece 56 about the longitudinal axis 28 relative to the solenoid 22. Although other materials are possible, the pole piece 56 and the armature 62 may both be made of 400 series magnetic steel.

The pole piece 56 is disposed within a pole piece sleeve 70. The pole piece sleeve 70 includes a pole piece sleeve wall 72 and a pole piece sleeve flange 74. The pole piece sleeve wall 72 is positioned radially between the bobbin 58 and at least part of the pole piece 56. The pole piece sleeve flange 74 extends radially outwardly from the pole piece sleeve wall 72 towards the solenoid body 26. The pole piece sleeve wall 72 maintains coaxial alignment of pole piece 56 with the bobbin 58, the coil 54, and the solenoid body 26. An electrical cover 76 is releasably connected to the solenoid body 26. The electrical cover 76 includes one or more electrical contacts 80 that are electrically connected to the coil 54. The electrical contacts 80 are configured to mate with an electrical connector (not shown) that supplies electricity to the solenoid pump 20.

Figure 2:
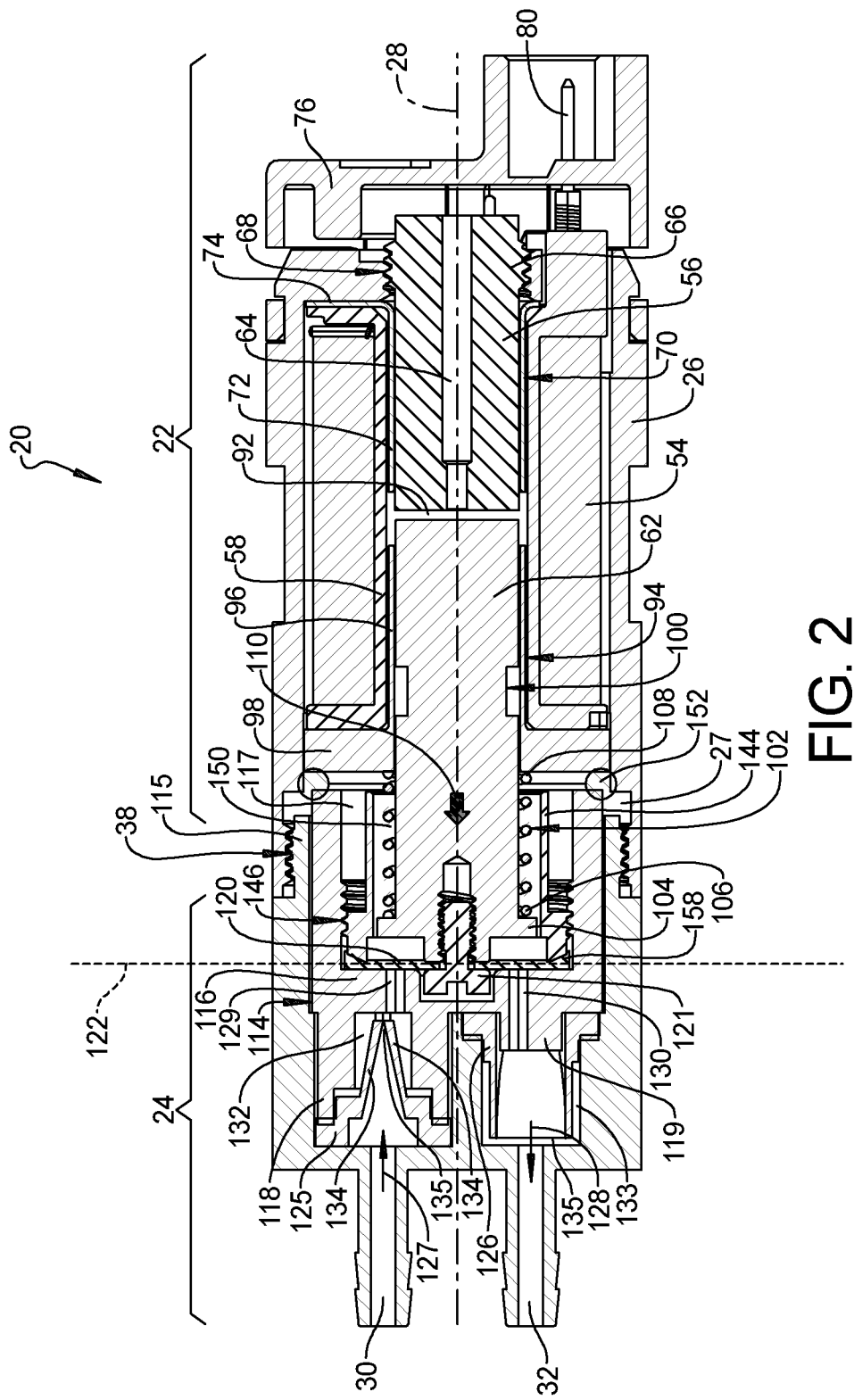
FIG. 2 is a side cross-sectional view of the exemplary solenoid pump illustrated in FIG. 1 where the armature of the exemplary solenoid pump is shown in a de-energized position.
Figure 3:
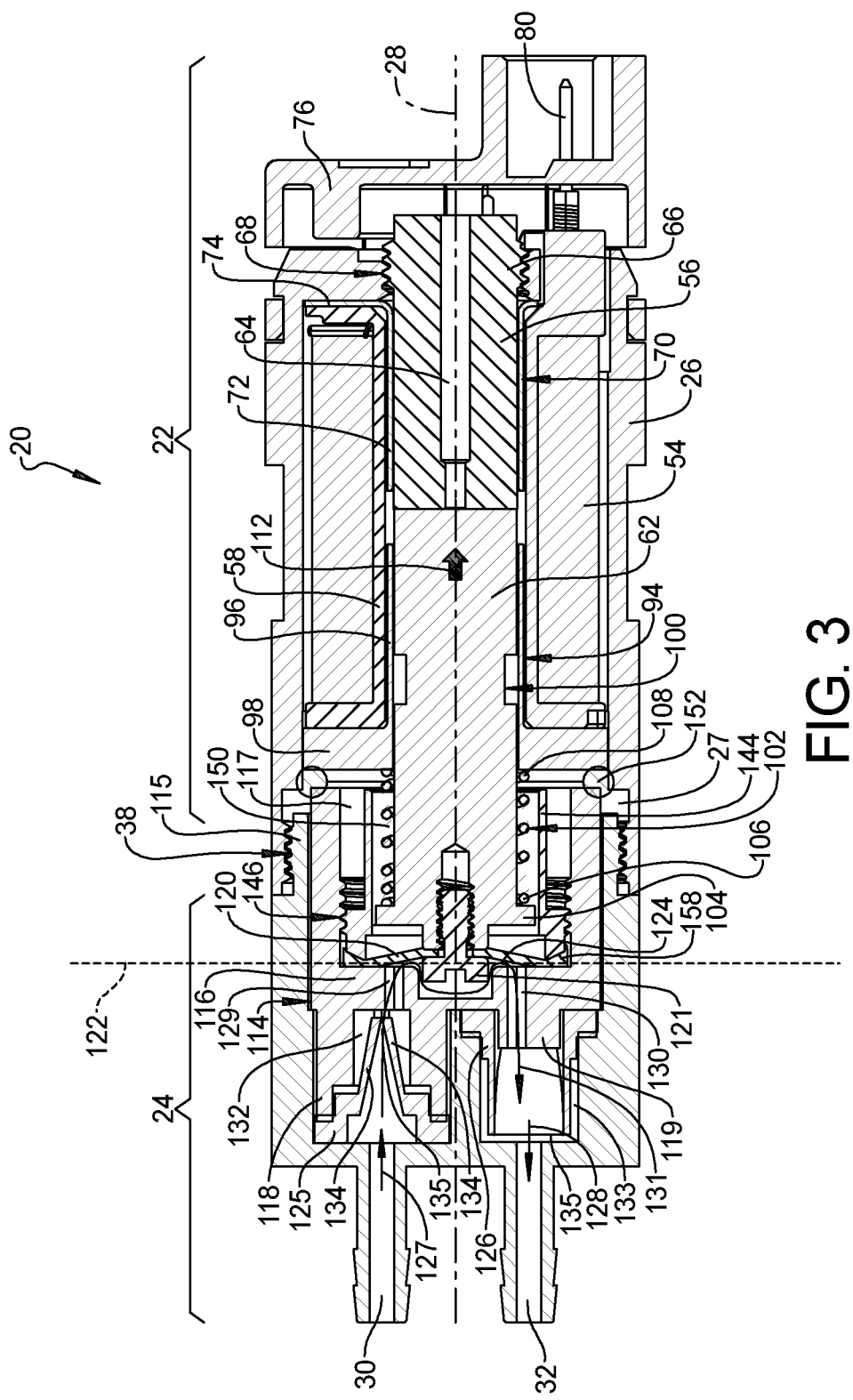
FIG. 3 is another side cross-sectional view of the exemplary solenoid pump illustrated in FIG. 1 where the armature of the exemplary solenoid pump is shown in an energized position.
Figure 4:
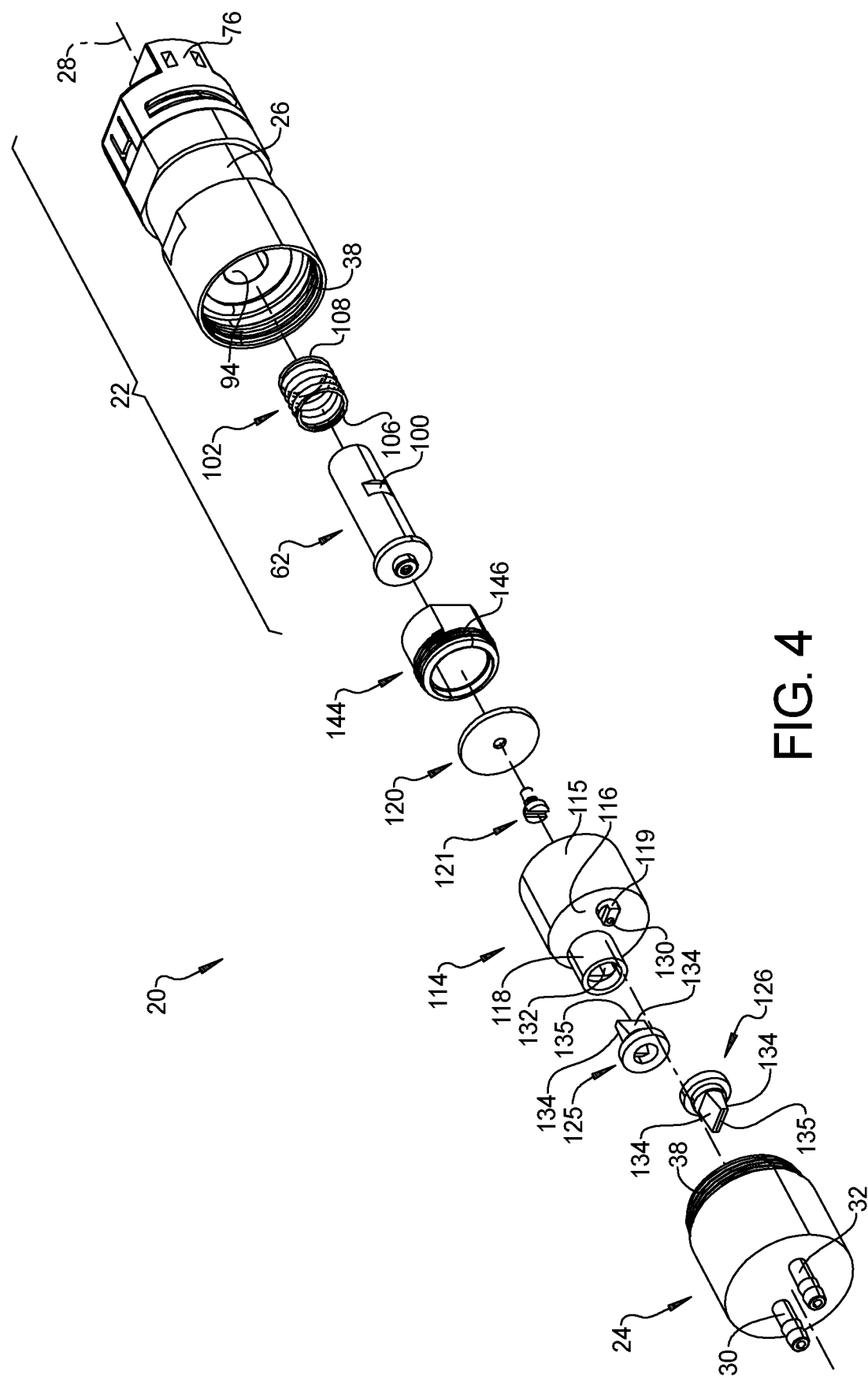
FIG. 4 is an exploded perspective view of the exemplary solenoid pump illustrated in FIG. 1.

As shown in FIG. 2, when the armature 62 is in the de-energized position, a clearance gap 92 is provided between the pole piece 56 and the armature 62. The armature 62 is slidably disposed within an armature bushing 94 positioned in the solenoid body 26. The armature bushing 94 includes an bushing sleeve 96 and an bushing flange 98. The bushing sleeve 96 is positioned radially between the bobbin 58 and at least part of the armature 62. The bushing flange 98 extends radially outwardly from the bushing sleeve 96 towards the solenoid body 26. The bushing sleeve 96 maintains coaxial alignment of armature 62 with the bobbin 58, the coil 54, and the solenoid body 26 during sliding displacement of the armature 62 between the energized and de-energized positions. Although other configurations are possible, the bushing sleeve 96 may be integrally connected to the bushing flange 98. The armature 62 may optionally include one or more flats 100 for holding the armature 62 during assembly of the solenoid pump 20.

A biasing member 102, such as a coiled metal compression spring, is positioned around armature 62. The armature 62 includes a biasing member seat 104 that extends radially outwardly toward the solenoid body 26. The biasing member 102 has a first biasing member end 106 that contacts the biasing member seat 104 of the armature 62 and a second biasing member end 108 that contacts the bushing flange 98. The biasing member 102 applies a biasing force 110 to the armature 62 that acts to bias the armature 62 towards the de-energized position (FIG. 2).

As shown in FIG. 3, when electricity is supplied to the coil 54, the coil 54 creates a magnetic field that causes the armature 62 to be magnetically attracted towards the pole piece 56, reducing or eliminating the clearance gap 92 between the pole piece 56 and the armature 62. The magnetic field imparts a magnetic force 112 on the armature 62 that overcomes the biasing force 110 of biasing member 102, which results in movement of the armature 62 to the energized position (FIG. 3). As long as electricity is supplied to the coil 54, the armature 62 will be held in the energized position.

The solenoid pump 20 includes a retainer body 114 that is disposed inside the internal chamber 27. The retainer body 114 includes a sleeve wall 115 and an end wall 116 that define an armature cavity 117 within the retainer body 114. The retainer body 114 also includes first and second valve support members 118, 119 that project longitudinally from the end wall 116 of the retainer body 114 toward the inlet and outlet ports 30, 32 in the base 24.

A diaphragm 120 is received in the armature cavity 117 in the retainer body 114 and is positioned adjacent to the end wall 116. The diaphragm 120 is attached/clamped to the armature 62 by a threaded fastener 121. During operation of the solenoid pump 20, the diaphragm 120 flexes between a first position when the armature 62 is in the de-energized position (FIG. 2) and a second position when the armature 62 is in the energized position (FIG. 3.) In the first position, the diaphragm 120 extends radially inwardly from the sleeve wall 115 of the retainer body 114 in a diaphragm plane 122 that is transverse to the longitudinal axis 28. This means that the diaphragm 120 is substantially flat when the armature 62 is in the de-energized position (FIG. 2). In the second position, the diaphragm 120 deflects away from the diaphragm plane 122 such that a pumping volume 124 is defined between the end wall 116 of the retainer body 114 and the diaphragm 120. Although various configurations and construction materials are possible, the diaphragm 120 may be made of rubber.

The solenoid pump 20 includes an inlet check valve 125 and an outlet check valve 126 that are both positioned inside the base 24. The inlet check valve 125 is arranged in fluid communication with the inlet port 30 in the base 24 and the outlet check valve 126 is arranged in fluid communication with the outlet port 32 in the base 24. The inlet check valve 125 is configured to permit fluid flow in only a first direction 127 moving from the inlet port 30 toward the diaphragm 120. The outlet check valve 126 is configured to permit fluid flow in only a second direction 128 moving from the diaphragm 120 toward the outlet port 32.

The retainer body 114 includes a retainer inlet passage 129 that extends through the end wall 116 of the retainer body 114 from the inlet check valve 125 to the diaphragm 120 and a retainer outlet passage 130 that extends through the end wall 116 of the retainer body 114 from the diaphragm 120 to the outlet check valve 126. The diaphragm 120 closes off the retainer inlet passage 129 and the retainer outlet passage 130 when the diaphragm 120 is in the first position and the armature 62 is in the de-energized position (FIG. 2). However, when armature 62 moves to the energized position, the diaphragm 120 is pulled away from the end wall 116 of the retainer body 114 to the second position, which opens the retainer inlet passage 129 and the retainer outlet passage 130 to the pumping volume 124 that is created between the end wall 116 of the retainer body 114 and the diaphragm 120. This creates a fluid flow path 131 that extends through the retainer inlet passage 129 in the retainer body 114 from the inlet check valve 125 to the pumping volume 124, through the pumping volume 124 between the end wall 116 of the retainer body 114 and the diaphragm 120, and through the retainer outlet passage 130 in the retainer body 114 from the pumping volume 124 to the outlet check valve 126. The fluid flow path 131 transports fluid from the inlet check valve 125 to the outlet check valve 126 as the diaphragm 120 oscillates between the first and second positions (FIGS. 2 and 3).

The solenoid pump 20 includes an inlet check valve cavity 132, positioned in the internal chamber 27, that is arranged in fluid communication with the inlet port 30 and the retainer inlet passage 129. The solenoid pump 20 further includes an outlet check valve cavity 133, also positioned in the internal chamber 27, that is arranged in fluid communication with the outlet port 32 and the retainer outlet passage 130. More specifically, the inlet check valve cavity 132 is defined by and is positioned in the first valve support member 118 in the retainer body 114. By contrast, the outlet check valve cavity 133 is defined by and is positioned in the base 24. The inlet check calve cavity 132 is positioned in direct fluid communication with the inlet port 30 and the retainer inlet passage 129. The outlet check valve cavity 133 is positioned in direct fluid communication with the outlet port 32 and the retainer outlet passage 130. The inlet check valve 125 is received within the inlet check valve cavity 132 and the outlet check valve 126 received within the outlet check valve cavity 133. The inlet and outlet check valves 125, 126 have a duck-bill configuration comprising two valve petals 134 that converge at a slit 135. The inlet and outlet check valves 125, 126 are turned 90 degrees relative to one another such that the slit 135 of the outlet check valve 126 has a perpendicular orientation relative to the slit 135 of the inlet check valve 125. A portion of the outlet check valve 126 receives the second valve support member 119. Although other configurations are possible, in the illustrated example the inlet and outlet check valves 125, 126 are made of an elastomeric material and the valve petals 134 are connected and part of a one-piece valve construction.

As shown in FIG. 2, the biasing force 110 of the biasing member 102 pushes the armature 62 to the de-energized position when no electricity is supplied to the coil 54. In this operational state, the diaphragm 120 assumes the first position and closes off the retainer inlet passage 129 and the retainer outlet passage 130. As shown in FIG. 3, the biasing force 110 of the biasing member 102 is overcome by the magnetic force 112 acting through pole piece 56 when the coil 54 is energized, which pulls the armature 62 to the energized position and the diaphragm 120 to the second position. Therefore, energizing the coil 54 opens the fluid flow path 131 leading from the inlet check valve 125 to the outlet check valve 126 and creates and/or increases the size (i.e., volume) of the pumping volume 124 between the end wall 116 of the retainer body 114 and the diaphragm 120. This draws fluid into the pumping volume 124 from the inlet port 30. This fluid intake flow travels in the first direction 127 from the inlet port 30, through the inlet check valve 125, through the retainer inlet passage 129, and into the pumping volume 124. The size (i.e., volume) of the pumping volume 124 is reduced when the diaphragm 120 returns to the first position in response to the armature 62 moving back to the de-energized position. This forces fluid out of the pumping volume 124 and into the retainer outlet passage 130. This fluid output flow travels in the second direction 128 from the pumping volume 124, through the retainer outlet passage 130, through the outlet check valve 126, and to the outlet port 32.

A diaphragm support sleeve 144 is disposed in the armature cavity 117 and is connected to the sleeve wall 115 of the retainer body 114 by a threaded connection 146. The diaphragm support sleeve 144 extends longitudinally, is generally cylindrical in shape, and is co-axially aligned with the longitudinal axis 28. The diaphragm support sleeve 144 extends annularly around and is spaced from the armature 62 to define a sleeve cavity 150 therein. The biasing member 102 is positioned in the sleeve cavity 150 radially between the armature 62 and the diaphragm support sleeve 144. The diaphragm support sleeve 144 abuts and supports at least part of the diaphragm 120. In other words, the diaphragm 120 is clamped between the diaphragm support sleeve 144 and the end wall 116 of the retainer body 114 when the diaphragm support sleeve 144 is threaded into the sleeve wall 115 of the retainer body 114.

A seal 152 is positioned between and contacts the sleeve wall 115 of the retainer body 114 and the bushing flange 98. The seal 152 accommodates tolerance variations between the retainer body 114 and the armature bushing 94. The diaphragm 120 may optionally include a peripheral lip 158. The peripheral lip 158 is received between the retainer body 114 and the diaphragm support sleeve 144 to secure the diaphragm 120 within the solenoid pump 20. In the illustrated example, the peripheral lip 158 of the diaphragm 120 has a ramp shaped cross-section; however, other shapes may be utilized.

The base 24, retainer body 114, and diaphragm support sleeve 144 according to several embodiments are created of a polymeric material. A polymeric material is used for multiple reasons, including: to reduce cost and weight of the solenoid pump 20, to permit the complex geometry of the base 24, retainer body 114, and diaphragm support sleeve 144 to be more easily manufactured using a molding operation, to reduce or eliminate corrosion of the base 24, retainer body 114, and diaphragm support sleeve 144, and to eliminate any effects of the magnetic field on the base 24, retainer body 114, and diaphragm support sleeve 144 during operation of the coil 54. In accordance with another embodiment, the base 24, retainer body 114, and diaphragm support sleeve 144 are made of metal such as stainless steel.

The configuration of the solenoid pump 20 described above can be assembled quickly and easily. For example, the following assembly process can be used. First, the inlet check valve 125 is placed in the inlet check valve cavity 132 in the retainer body 114 and the outlet check valve 126 is placed in the outlet check valve cavity 133. The retainer body 114 is then inserted into the internal chamber 27 in the base 24. The diaphragm 120 is mounted on the armature 62 using fastener 121 and the armature 62 and diaphragm 120 are then inserted as an assembly into the armature cavity 117 in the retainer body 114. The diaphragm support sleeve 144 is then threaded into the retainer body 114 to clamp the diaphragm 120 against the end wall 116 of the retainer body 114. The biasing member 102 is then slid over the armature 62 and into the sleeve cavity 150. The base 24 is then threaded onto the solenoid 22.

In operation, the rapid oscillatory motion of the diaphragm 120 between the first and second positions pumps fluid along the fluid flow path 131. As a result, the solenoid pump 20 can be used in place of a traditional peristaltic pump, which uses a cam and an electric motor to pump fluid through a tube. One of the benefits of the solenoid pump 20 disclosed herein over traditional peristaltic pumps is that the solenoid 22 offers improved reliability over the electric motors used in peristaltic pumps. Although other applications are possible, one intended application for the solenoid pump 20 disclosed herein is in the medical industry in dosing applications where a fluid pump is needed to deliver accurate amounts of liquid.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solenoid pump, comprising:
    a solenoid having a coil and a pole piece positioned in a solenoid body;
    a base including an inlet port and an outlet port, the base connected to the solenoid body such that the base and the solenoid body cooperate to define an internal chamber;
    a retainer body disposed inside the internal chamber that includes an armature cavity;
    an armature slidably disposed in the coil of the solenoid and the armature cavity for movement along a longitudinal axis between an energized position and a de-energized position;
    a diaphragm mounted in the armature cavity that is connected to the armature such that the diaphragm deflects from a first position to a second position in response to movement of the armature along the longitudinal axis from the de-energized position to the energized position;
    an inlet check valve positioned in the internal chamber and arranged in fluid communication with the inlet port that permits fluid flow in only a first direction moving from the inlet port toward the diaphragm;

an outlet check valve positioned in the internal chamber and arranged in fluid communication with the outlet port that permits fluid flow in only a second direction moving from the diaphragm toward the outlet port; and a fluid flow path extending through the retainer body from the inlet check valve to the diaphragm and from the diaphragm to the outlet check valve that transports fluid from the inlet check valve to the outlet check valve as the diaphragm oscillates between the first and second positions, wherein the fluid flow path is defined by a retainer inlet passage that extends through the retainer body from the inlet check valve to the diaphragm, a pumping volume that is positioned between the retainer body and the diaphragm when the diaphragm deflects to the second position in response to the armature moving to the energized position, and a retainer outlet passage that extends through the retainer bod from the diaphragm to the outlet check valve, wherein the diaphragm is arranged to close off both the retainer inlet passage and the retainer outlet passage in the first position, sealinq both the retainer inlet passage and the retainer outlet passage from the pumping volume when the diaphragm is in the first position.

2. The solenoid pump of claim 1, further comprising:
a diaphragm support sleeve, positioned in the armature cavity, that abuts and supports at least part of the diaphragm, wherein at least part of the armature is received in the diaphragm support sleeve.

3. The solenoid pump of claim 2, wherein a biasing member, disposed in the armature cavity, acts to normally bias the armature toward the de-energized position, the biasing member positioned radially between the armature and the support sleeve.

4. The solenoid pump of claim 3, wherein the armature includes a biasing member seat that extends radially outwardly toward the support sleeve and the biasing member has a first biasing member end that contacts the biasing member seat of the armature.

5. The solenoid pump of claim 4, further comprising:
a bobbin disposed in the solenoid body that supports the coil, at least part of the pole piece and at least part of the armature slidably received in the bobbin; and
an armature bushing including a bushing sleeve and a bushing flange, the bushing sleeve disposed radially between the bobbin and at least part of the armature, the bushing flange extending radially outwardly from the bushing sleeve towards the solenoid body, and the biasing member including a second biasing member end that contacts the bushing flange.

6. The solenoid pump of claim 5, further comprising:
a seal positioned between and contacting the retainer body and the bushing flange.

7. The solenoid pump of claim 1, further comprising:
an inlet check valve cavity, positioned in the internal chamber, that is arranged in fluid communication with the inlet port and the retainer inlet passage, the inlet check valve received within the inlet check valve cavity; and
an outlet check valve cavity, positioned in the internal chamber, that is arranged in fluid communication with the outlet port and the retainer outlet passage, the outlet check valve received within the outlet check valve cavity.

8. The solenoid pump of claim 7, wherein the inlet check valve cavity is defined by and positioned in the retainer body and the outlet check valve cavity is defined by and positioned in the base.

9. The solenoid pump of claim 1, wherein the size of the pumping volume is reduced when the diaphragm returns to the first position in response to the armature moving to the de-energized position.

10. The solenoid pump of claim 1, wherein each of the inlet and outlet check valves has a duck-bill configuration comprising two valve petals that converge at a slit.

11. The solenoid pump of claim 10, wherein the inlet and outlet check valves are turned 90 degrees relative to one another such that the slit of the outlet check valve has a perpendicular orientation relative to the slit of the inlet check valve.

12. The solenoid pump of claim 1, wherein the diaphragm includes a peripheral lip that is received between the retainer body and the diaphragm support sleeve to secure the diaphragm within the armature cavity.

13. The solenoid pump of claim 12, wherein the peripheral lip of the diaphragm has a ramp shaped cross-section.

14. The solenoid pump of claim 1, wherein the diaphragm extends in a diaphragm plane that is transverse to the longitudinal axis in the first position and is deflects away from the diaphragm plane in the second position.

15. The solenoid pump of claim 1, further comprising:
a fastener threadably engaged with the armature that clamps the diaphragm to the armature.

16. The solenoid pump of claim 1, wherein the pole piece includes a threaded end that engages internal threads in the solenoid body and permits an axial position of the pole piece to be selected by rotation of the pole piece with respect to the solenoid body.

17. A solenoid pump, comprising:
a solenoid having a coil and a pole piece positioned in a solenoid body;
a base including an inlet port and an outlet port, the base connected to the solenoid body such that the base and the solenoid body cooperate to define an internal chamber;
a retainer body disposed inside the internal chamber that includes an armature cavity;
an armature slidably disposed in the coil of the solenoid and the armature cavity for movement along a longitudinal axis between an energized position and a de-energized position;
a diaphragm mounted in the armature cavity that is connected to the armature such that the diaphragm deflects from a first position to a second position in response to movement of the armature along the longitudinal axis from the de-energized position to the energized position;
an inlet check valve positioned in the internal chamber and arranged in fluid communication with the inlet port that permits fluid flow in only a first direction moving from the inlet port toward the diaphragm;
an outlet check valve positioned in the internal chamber and arranged in fluid communication with the outlet port that permits fluid flow in only a second direction moving from the diaphragm toward the outlet port; and
a fluid flow path defined by a retainer inlet passage that extends through the retainer body from the inlet check valve to the diaphragm, a pumping volume that is positioned between the retainer body and the diaphragm when the diaphragm deflects to the second position in response to the armature moving to the energized position, and a retainer outlet passage that extends through the retainer body from the diaphragm to the outlet check valve, wherein the diaphragm is arranged to close off both the retainer inlet passage and the retainer outlet passage in the first position, sealing both the retainer inlet passage and the retainer outlet passage from the pumping volume when the diaphragm is in the first position.

18. A solenoid pump, comprising:

a solenoid having a coil and a pole piece positioned in a solenoid body;

a base including an inlet port and an outlet port, the base connected to the solenoid body such that the base and the solenoid body cooperate to define an internal chamber;

a retainer body disposed inside the internal chamber that includes an armature cavity;

an armature slidably disposed in the coil of the solenoid and the armature cavity for movement along a longitudinal axis between an energized position and a de-energized position;

a biasing member disposed in the armature cavity that acts to normally bias the armature toward the de-energized position;

a diaphragm mounted in the armature cavity that is connected to the armature such that the diaphragm deflects from a first position to a second position in response to movement of the armature along the longitudinal axis from the de-energized position to the energized position;

an inlet check valve positioned in the internal chamber and arranged in fluid communication with the inlet port that permits fluid flow in only a first direction moving from the inlet port toward the diaphragm;

an outlet check valve positioned in the internal chamber and arranged in fluid communication with the outlet port that permits fluid flow in only a second direction moving from the diaphragm toward the outlet port;

an inlet check valve cavity, positioned in the internal chamber, that is arranged in fluid communication with the inlet port, the inlet check valve received within the inlet check valve cavity;

an outlet check valve cavity, positioned in the internal chamber, that is arranged in fluid communication with the outlet port, the outlet check valve received within the outlet check valve cavity;

a retainer inlet passage that extends through the retainer body between the inlet check valve cavity and the diaphragm;

a retainer outlet passage that extends through the retainer body between the diaphragm and the outlet check valve cavity, and a pumping volume that is positioned between the retainer body and the diaphragm when the diaphragm deflects to the second position in response to the armature moving to the energized position, wherein the diaphragm is arranged to close off both the retainer inlet passage and the retainer outlet passage in the first position, sealing both the retainer inlet passage and the retainer outlet passage from the pumping volume when the diaphragm is in the first position.

* * * * *